United States Patent [19]

Evans

[11] Patent Number: 5,306,033
[45] Date of Patent: Apr. 26, 1994

[54] SHOPPING CART BUMPER

[76] Inventor: Harold A. Evans, 10 Merrymount Dr., Swampscott, Mass. 01907

[21] Appl. No.: 951,398

[22] Filed: Sep. 25, 1992

[51] Int. Cl.⁵ .............................................. B62B 3/00
[52] U.S. Cl. ................... 280/33.992; 293/117
[58] Field of Search .............. 293/102, 117, 126, 115; 280/33.991, 33.992

[56] References Cited

U.S. PATENT DOCUMENTS

| | | | |
|---|---|---|---|
| 3,195,912 | 7/1965 | Howard et al. | 280/33.992 |
| 4,600,204 | 7/1986 | Badger | 280/33.992 |
| 4,883,281 | 11/1989 | Waterman | 280/33.992 |
| 4,922,639 | 5/1990 | Rehrig | 280/33.991 X |
| 5,111,604 | 5/1992 | Rehrig | 280/33.991 X |
| 5,131,669 | 7/1992 | Kinnamon et al. | 280/33.992 |

FOREIGN PATENT DOCUMENTS

| | | | |
|---|---|---|---|
| 341029 | 11/1989 | European Pat. Off. | 280/33.992 |
| 3340399 | 5/1985 | Fed. Rep. of Germany | 280/33.991 |
| 3932593 | 4/1991 | Fed. Rep. of Germany | 280/33.992 |
| 595079 | 1/1978 | Switzerland | 280/33.992 |
| 2217504 | 10/1989 | United Kingdom | 280/33.992 |

Primary Examiner—Joseph D. Pape
Attorney, Agent, or Firm—Wolf, Greenfield & Sacks

[57] ABSTRACT

A shoppping cart basket bumper provides a sheet of resilient material that overlaps a substantial surface of a shopping cart basket. The bumper sheet is firmly attached to the outer face of the basket utilizing a structure positioned along the inner face of the basket that is fastened through openings in the basket to the sheet. The bumper can include rails and slots for holding advertising placards on each of the inside and outside exposed sides of the basket.

21 Claims, 7 Drawing Sheets

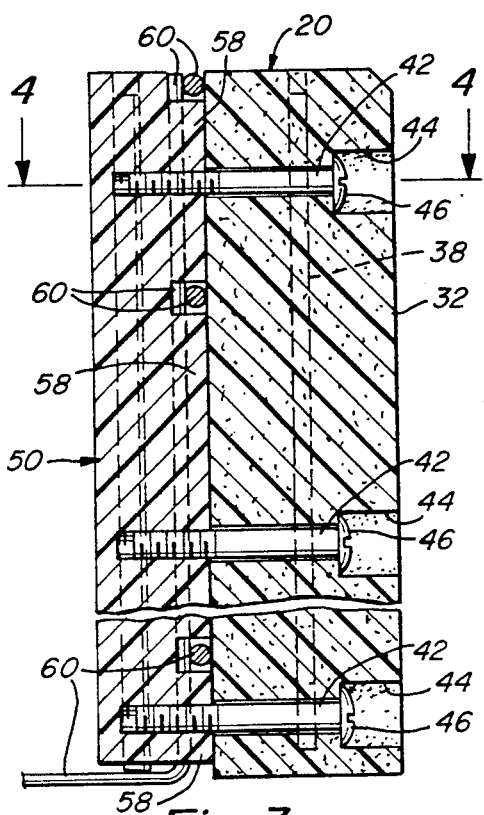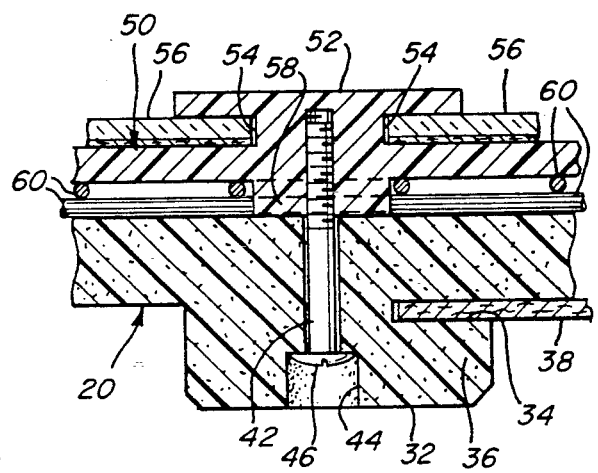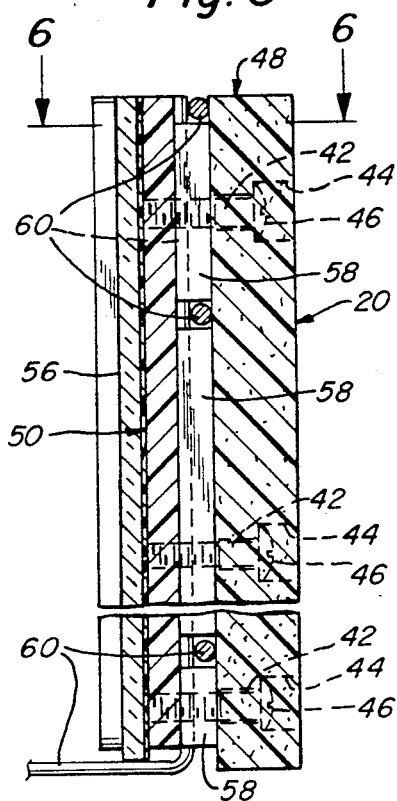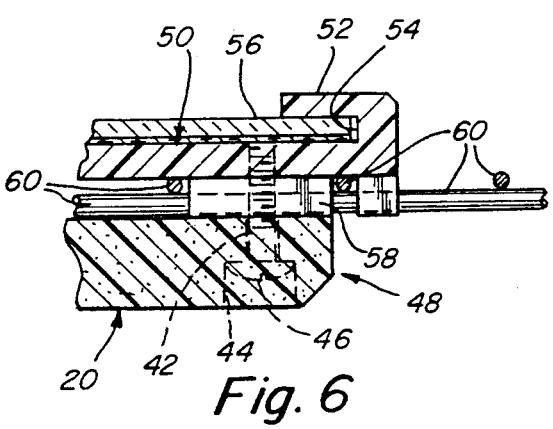
Fig. 3
Fig. 4
Fig. 5
Fig. 6

SHOPPING CART BUMPER

FIELD OF THE INVENTION

The present invention relates to a shopping cart bumper for minimizing damage to objects due to impact from moving shopping carts.

BACKGROUND OF THE INVENTION

A substantial amount of damage to vehicles is caused each year by unattended and carelessly directed shopping carts in store parking lots. Shopping carts have a tendency to roll into the sides of vehicles causing dings, scrapes and small dents to vehicle body work. A large number of such impacts occur when shopping carts roll front end first into vehicles. The alignment of the wheels of the shopping cart and the distribution of its weight make front-on impacts quite likely.

In an attempt to minimize damage from front on impacts, existing shopping cart designs often incorporate the small bumpers of hard plastic along the bottom front corners of the shopping cart basket. While these bumpers can reduce damage from scraping of the basket against painted surfaces such as display cases and vehicle body work, they are too hard to effectively absorb impact energy in a cart-to vehicle collision. Hence, such bumpers do not substantially reduce the damage caused to vehicles by shopping cart impacts.

It is therefore an object of the present invention to provide a more effective bumper system over, preferably, the front of a shopping cart basket to more efficiently absorb energy generated from impacts. It is a further object of this invention to provide a bumper for shopping carts that can be attached to existing basket structures without significant alteration to the basket. It is yet another object of this invention to provide a shopping cart bumper that is easily manufactured and that is adaptable to fit a wide variety of shopping cart basket shapes without substantial alteration of the basket or bumper.

SUMMARY OF THE INVENTION

A shopping cart bumper according to this invention includes a sheet of elastomeric material sized to fit over substantially the entire surface of, for example, the front of a shopping cart. The sheet can comprise a cross linked polyethylene foam or other resilient material. The sheet is attached over the front face of the shopping cart basket and, preferably, around the basket's front corners.

In a preferred embodiment, the front face of the sheet includes a pair of vertically directed rails that can include slots for holding a placard. The rails and rear edges are preferably attached to a fastening structure positioned on the inside of the shopping cart basket. The fastening structure and sheet are held together by fasteners, adhesives or other suitable means that pass through openings in the shopping cart. The openings can be spaces between rails of the basket.

The fastening structure can comprise a sheet of rigid material having holes adapted to receive fasteners or can comprise individual structures or plates positioned proximate each set of fasteners. The fastening structure can include rails for attachment of additional placards that face into the interior of the shopping cart basket.

BRIEF DESCRIPTION OF THE DRAWINGS

The foregoing and other objects and advantages of the invention will become more clear with reference to the following detailed description of the preferred embodiments as illustrated by the drawings in which:

FIG. 3 is a partial cross sectional side view of the bumper taken along line 3—3 of FIG. 2 detailing the attachment arrangement according to one embodiment of this invention;

FIG. 4 is a cross-sectional top view taken along line 4—4 of FIG. 3 further detailing the attachment arrangement according to this embodiment;

FIG. 5 is another broken cross sectional side view taken along line 5—5 of FIG. 2 detailing the attachment of the bumper edge to the cart basket;

FIG. 6 is a partial cross sectional top view taken along line 6—6 of FIG. 5;

DETAILED DESCRIPTION

Figure 1:
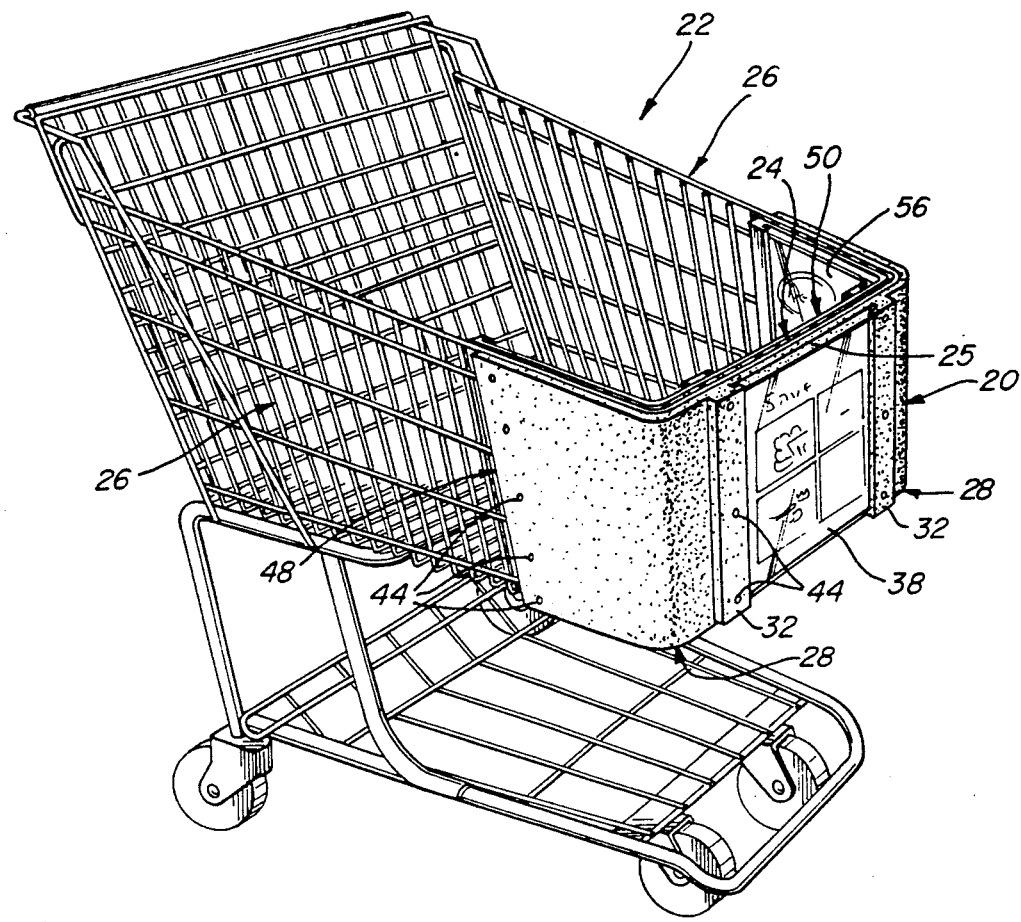
FIG. 1 is a perspective view of a shopping cart having a bumper according to this invention.
Figure 2:
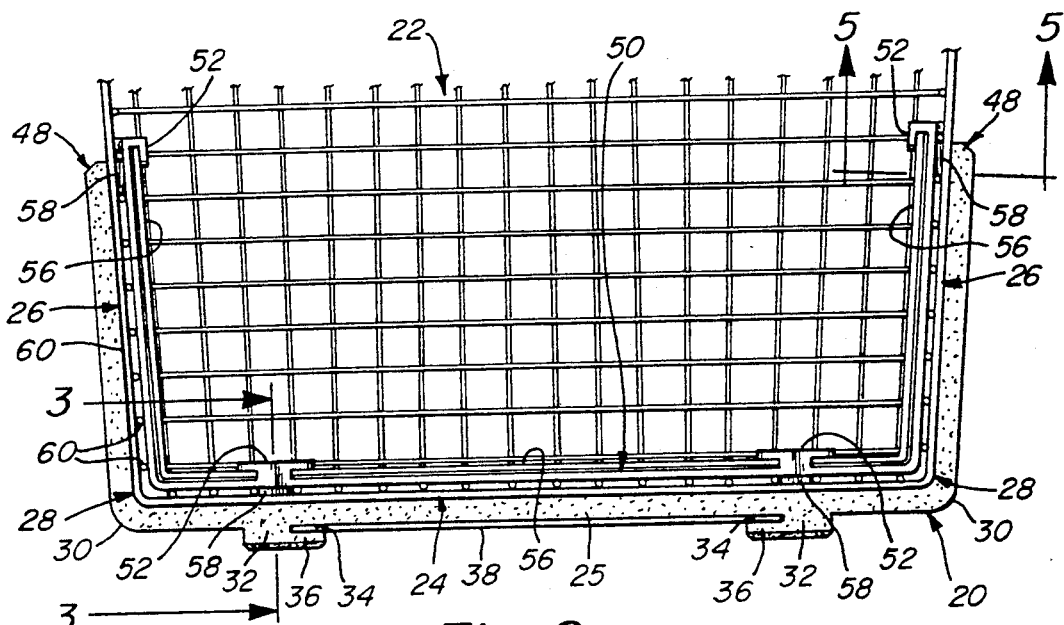
FIG. 2 is a partial top view of the shopping cart of FIG. 1 showing the bumper.

FIGS. 1-7 detail a shopping cart bumper 20 according to one embodiment of this invention. In order to adequately protect a large variety of objects from potential impacts with shopping carts, it is preferable to cover the entire front of the shopping cart basket 22. Hence, the shopping cart of FIG. 1 includes a bumper 20 that covers the entire front end or "front side" 24 of the basket 22 and that wraps around the basket sides 26. In this way, a vehicle is further protected from impacts by the front corners 28 of the cart basket.

In a preferred embodiment, the bumper 20 according to this invention is constructed of a foam such as crossed linked polyethelene. The foam utilized should have suitable elasticity to absorb significant impacts without causing dings or dents in the sheet metal common to vehicle bodies. However, the foam should be sufficiently sturdy that it will not chafe or tear from prolonged use. A variety of foams and elastomeric compounds having these general characteristics are contemplated according to this invention.

The bumper 20 is constructed in a preferred embodiment from an integral piece of foam that can be molded to substantially conform to the shape of the shopping cart front end 24, including bends 30 at the corners 28 of the basket 22. Alternatively, the bumper front panel 25 can be constructed as a flat sheet that is designed to be forcibly wrapped around the front of the cart and then secured in placealong the basket sides 26. The foam can include serrations or stress relief points along its inner surface proximate the basket corner locations in order to facilitate a tight bend around the corners.

As depicted in FIGS. 1, 2, 4 and 7, the foam bumper 20 includes integrally molded vertical rails 32 at its outward facing front surface with slots 34 and outer shoulders 36 for accommodating an advertising placard 38. The slots 34 in this example are open at the top so that the placards can be changed to accommodate changing advertising needs. The term "vertical rails" according to this invention can include structures that comprise raised surfaces over a large area of the bumper. The rails 32 further enhance the shock absorbing capabilities of a bumper-equipped cart front.

Figure 7:
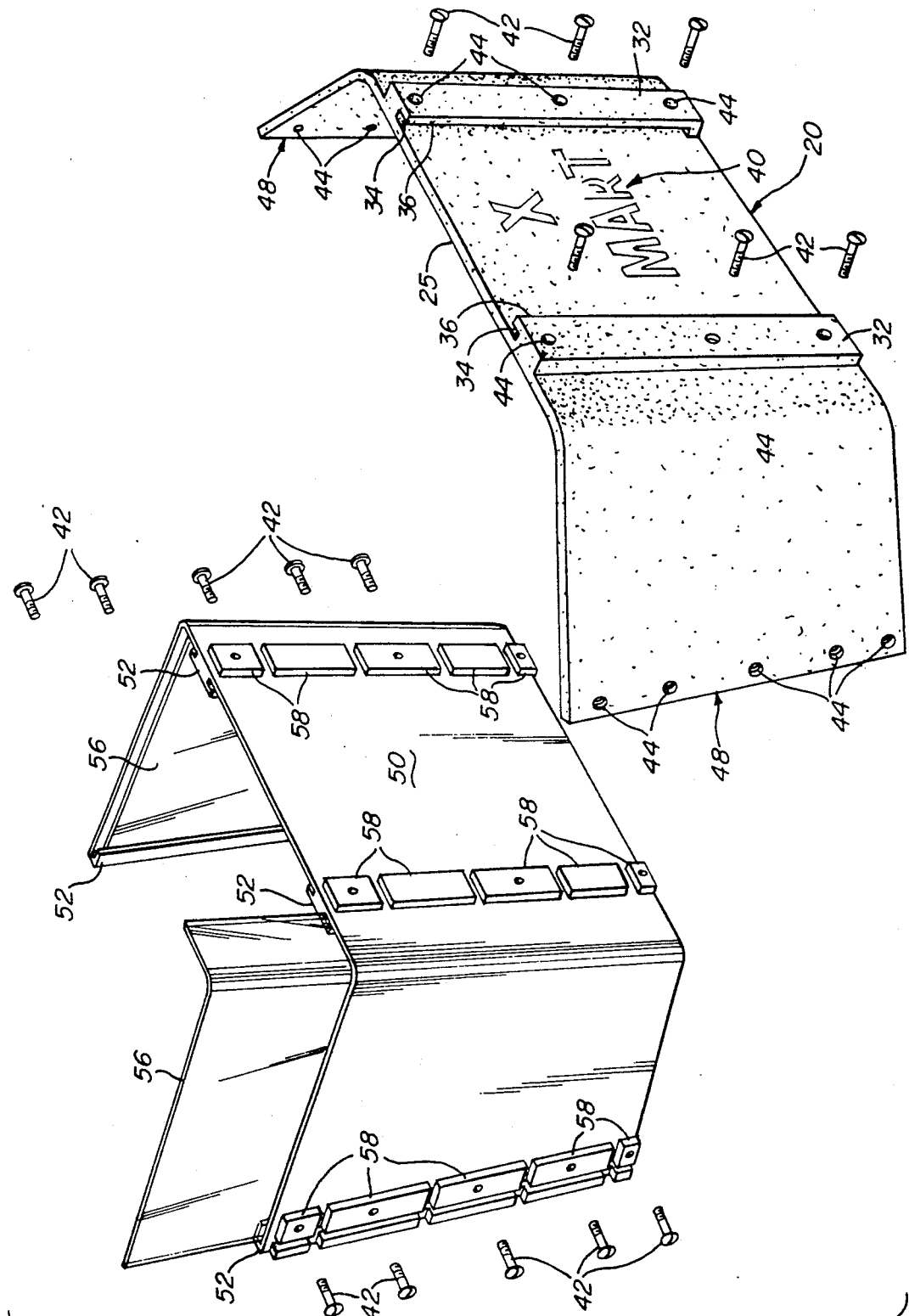
FIG. 7 is an exploded perspective view of the shopping cart bumper of FIG. 1.

As depicted in FIG. 7, the bumper face beneath the placard 38 can include lettering pattern 40 such as the store name. This pattern can be applied by painting, screen printing or other suitable processes. Alternatively, the lettering can be pressed into the foam face by heat, pressure or both.

As noted above, shopping cart basket shapes vary substantially. An advantage of the bumper 20 according to this embodiment is that it can be adapted to fit virtually all existing shopping cart shapes constructed from either wire or plastic. Hence, the bumper 20 according to this embodiment can be supplied to a user oversized relative to a certain basket and can be quickly cut by a scissor or shear by the user so that its outer edges fit flushly with the edges of the basket front. In this manner, a generic bumper assembly can be easily adapted to a wide variety of cart sizes and configurations.

Attachment of the bumper 20 according to FIGS. 1-7 is accomplished preferably by means of screws, pins or other fasteners 42 that pass through the outer face of the bumper into the interior of the basket. In this embodiment, the bumper face includes a plurality of countersunk holes 44 such as those shown in FIGS. 3-6. The head 46 of the screw 42 (or other headed fastener) seats into a hole 44 at a depth that prevents the head 46 from contacting with a vehicle surface upon impact. In this example, fastener holes 44 are located along the front panel 25 of the bumper within the vertical rails 32 and also along the rear edges 48 of the bumper 20. Attachment of the front vertical rails 32 is further detailed in FIGS. 3 and 4. Attachment of the rear edges 48 is further detailed in FIGS. 5 and 6. The thick vertical rails 32 allow for deep seating of fastener heads 46 to prevent inadvertent exposure of the heads to an object. The screws 42 are threaded into an inner panel 50 that acts as a backing structure to hold the fasteners.

In this embodiment, the fastener structure panel 50 covers virtually the entire inwardly facing front surface of the basket 22. The inner panel 50 can be constructed from PVC, Lexan ® or other suitable clear and opaque materials. The material should be sufficiently durable to withstand continual use. The inner panel 50 includes a plurality of inner rails 52 with slots 54 in this embodiment that enable three advertising placards to be mounted upon the inside of the basket 22 facing the shopper. One placard is mounted in the center and two curved placards are mounted along the sides of the basket interior. The placards can be shielded by means of clear panels 56 (FIGS. 2 and 7) that fit within the slots.

The outer facing face of the inner panel 50 in this embodiment includes several raised rectangular surfaces 58 that can be molded in conjunction with the panel. These surfaces are shaped to pass between the basket's wire rails 60 in order to contact the inner surface of the foam. Hence, when the foam is attached to the inner panel 50 by means of (for example) fasteners 44, the bumper's attachment locations remain flush with the rest of the foam panel and do not tend to sink in between the basket rails 60.

While the raised surfaces 58 according to this embodiment are shown as squares that closely follow the outline of the basket rails 60, the raised surfaces can also comprise smaller circles, squares or other geometric shapes that are substantially smaller than the spacing between basket rails 60. Such raised surfaces are shown, for example, in FIGS. 13 and 14 to be described further below. In this manner, the design of the inner panel 50 need not be limited to a single shopping cart design. As long as some space between basket rails is present in the particular cart to be outfitted with the bumper 20, the bumper can be adapted to that cart. This is because, the raised surfaces 58 can pass through the basket rails of that cart to lie flush against the inner surface of the foam bumper. In this embodiment, the raised surfaces 58 that interact with fasteners include holes 44 that are sized and adapted (having, for example, threads) to mate with the fasteners 44.

In this embodiment, sets of fasteners are positioned along the front and along the rear edges of the bumper. However, a greater or lesser number of fasteners can be utilized according to this invention. It is important primarily that the bumper remain firmly attached to the shopping cart front despite rough usage over a long period of time. In fact, adhesives can be substituted for fasteners in this invention in embodiments such as FIG. 1. The raised surfaces 58 can be adhered to the inner surface of the foam by means of such adhesives, eliminating the need for some or all of the fasteners.

Figure 8:
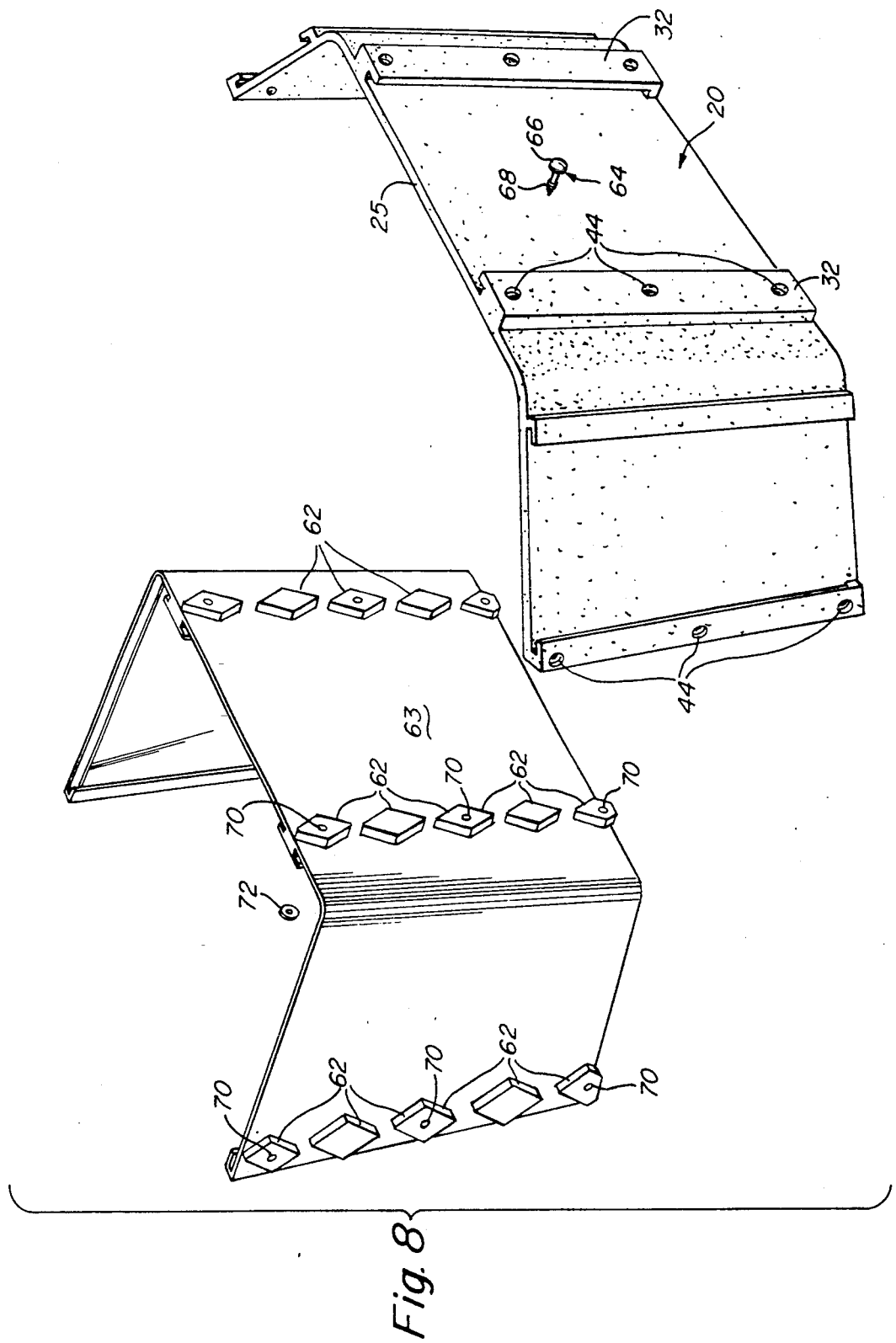
FIG. 8 is an exploded view of an alternative embodiment of the bumper according to this invention adapted for use with certain forms of plastic shopping cart baskets.

As noted above, the raised surfaces of the inner panel can vary based upon the configuration and spacing of the basket rails 60. FIG. 8 depicts an alternative embodiment of the present invention particularly suited to plastic shopping carts (not shown) having a typical diamond-shaped basket pattern. Note that the raised surfaces 62 of the inner panel 63 trace a diamond outline to fit into the diamond square shaped basket openings. As noted above, smaller or round shapes can also be used for such carts.

Additionally, the fasteners according to this embodiment comprise plastic pins 64 with enlarged heads 66 and serrated shaft ends 68. These pins 64 are designed to seat into corresponding holes 70 in the inner panel 63. Due to the arrow like construction of the serrated shaft end 68, it tends to enter a hole easily and rapidly, but resist removal so that the foam bumper 20 is substantially permanently secured to the inner panel 63. Alternatively, a securing washer 72 can be utilized in conjunction with the arrow-like serrated end 68 of the fastener shaft. The washer 72 becomes secured to the end 68 of the shaft by application of pressure, and the foam bumper and inner panel become sandwiched between the washer 72 and pin head 66.

While the full sized overlapping inner panel according to this invention is useful in allowing a plurality of advertising placards to be mounted along the interior of the basket, it can be omitted if necessary or desirable. FIGS. 9–12 depict an alternative embodiment of the bumper according to this invention without a full inner panel.

Figure 10:
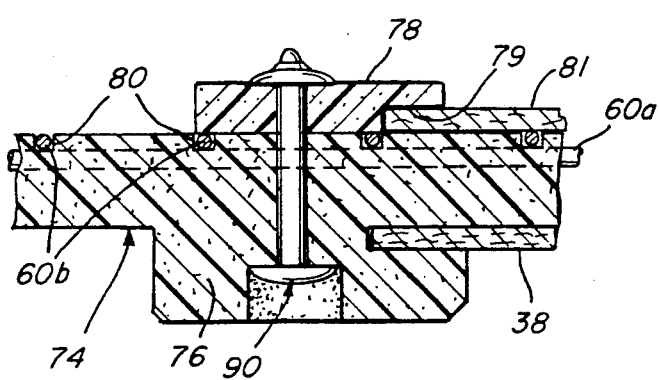
FIG. 10 is a partial cross sectional top view of an attachment arrangement taken along line 10—10 of FIG. 9.

The bumper 74 of this embodiment is fastened by means of fasteners along its front vertical rails 76 to the interior of the shopping cart basket 22 against a pair of inner vertical rails 78 that are formed, preferably, of a rigid durable material such as PVC or other plastic compounds (See FIG. 10). The inner vertical rails 78 are wide enough to overlap the wire rails 60 of the shopping cart basket so that the inner vertical rails 78 are not drawn into the space between basket wire rails 60. Hence, the vertical rails 78 of this embodiment comprise the bumper fastening structure. Note that other fastening structure shapes (circular, square, etc.) are contemplated according to this invention. Such structures are generally shaped so that they cannot pass between the basket rails 60. In this manner, the structures firmly anchor the bumper to the cart basket. The inner vertical rails 78 according to this embodiment also include slots 79 for mounting of a placard 81 along the center front interior of the basket.

Unlike the prior embodiments depicted herein, the foam bumper 74 according to this embodiment includes a series of grooves 80 along its inner surface 82 (shown most clearly in FIG. 12) that allow the inner surface 82 to pass through the basket rails 60 to lay flushly within the interior of the shopping cart. Alternatively, the interior vertical rails (or other shapes of fastener structures can include raised projections like those shown for each of the full inner panels described above.

A disadvantage of bumper face grooves is that they limit the bumper s versatility to, essentially, a single basket shape and configuration. However, where a large number of similar baskets are to be outfitted with bumpers, it may prove cost effective to provide a grooved surface according to this embodiment. A counterveiling advantage of the grooved surface is that it creates a tight and non-slip engagement with the shopping cart basket front.

Figure 9:
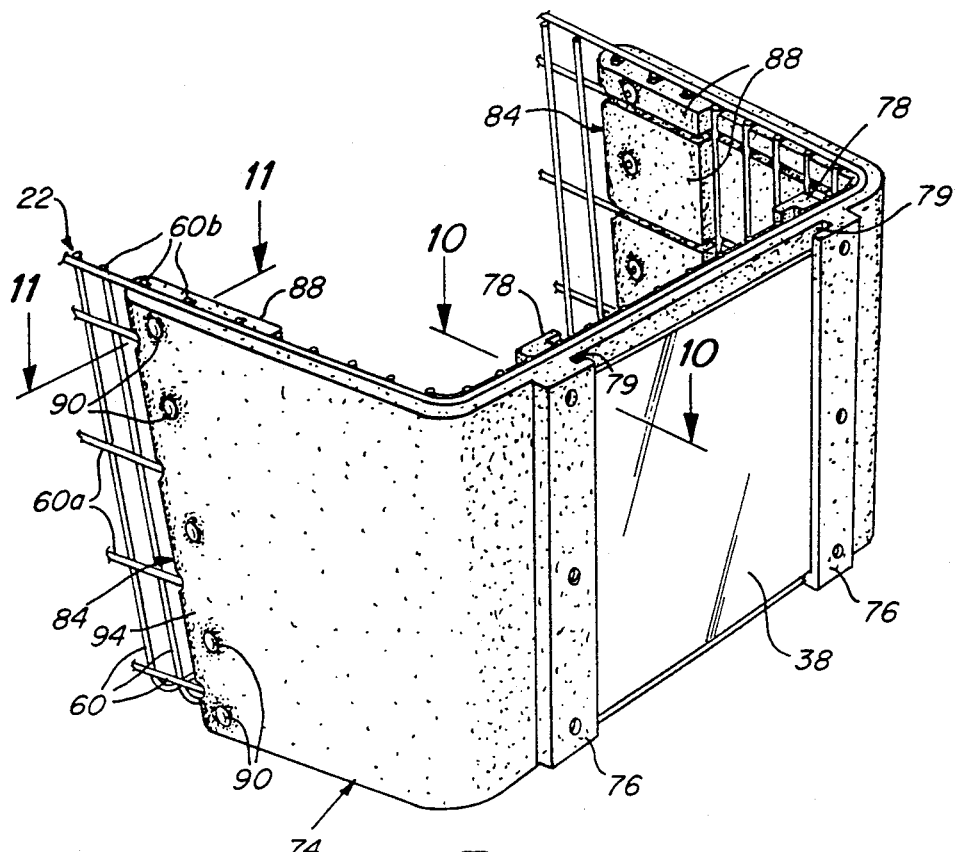
FIG. 9 is another alternative embodiment of the bumper according to this invention.
Figure 11:
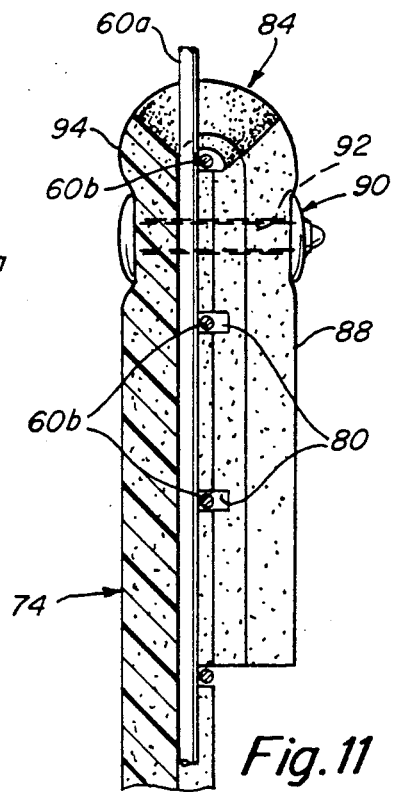
FIG. 11 is a partial cross sectional top view of end attachment structure taken along line 11—11 of FIG. 9.
Figure 12:
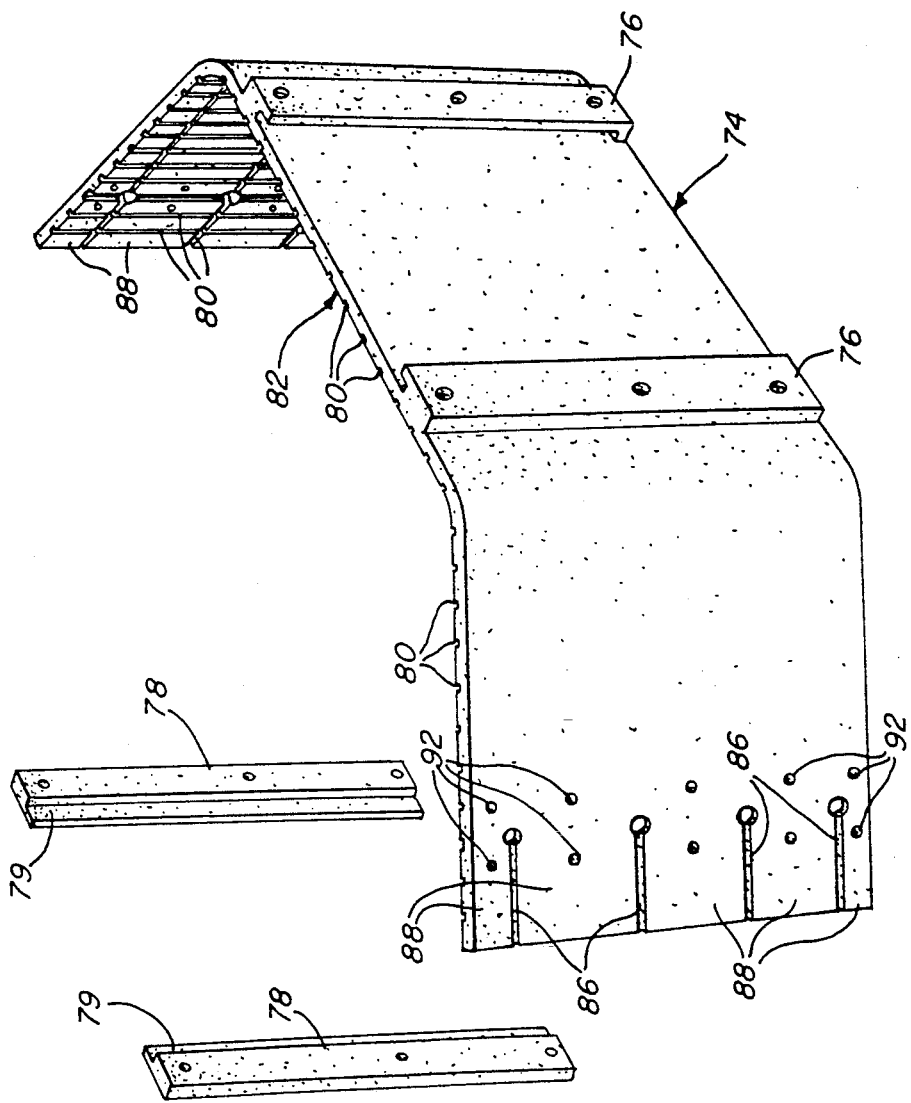
FIG. 12 is an exploded perspective view of the shopping cart bumper of FIG. 9.

An additional feature according to this embodiment is the overlapping attachment of the bumper ends 84 as depicted in FIG. 11. The ends 84 include a plurality of slots 86 (See FIG. 12) that allow the fingers 88 of foam formed thereby to pass through the horizontal basket rails 60a and wrap back around the vertical basket rails 60b toward the front of the basket 22. The wrapped fingers 88 are fastened to the external bumper 74 using sandwiching fasteners 90 as shown in FIGS. 9 and 11. Holes 92 are provided in the fingers 88 and outer bumper end 94 to accommodate these fasteners 90. The use of overlapping fingers 88 at the ends of the bumper can provide a very firm and non-slidable connection to the basket.

It is equally possible to provide inner rails or other separate fastening structures to secure the rear edges of the embodiment of FIGS. 9–12 like the inner vertical rails 78 provided to secure the bumper's front surface. In general, the various elements of the bumper embodiments depicted herein can be combined in different ways depending upon the chosen application for the bumper. In addition, each of the exposed surfaces of the bumper can be adapted to carry advertising or other information placed either directly upon the surface of the bumper or on removably attached placards.

Similarly, advertising sheets can be attached by, for example, adhesive to the face of the foam. In particular, the sides and corners of the front face of the bumper can provide an appropriate area for adhering advertisement sheets.

Figure 13:
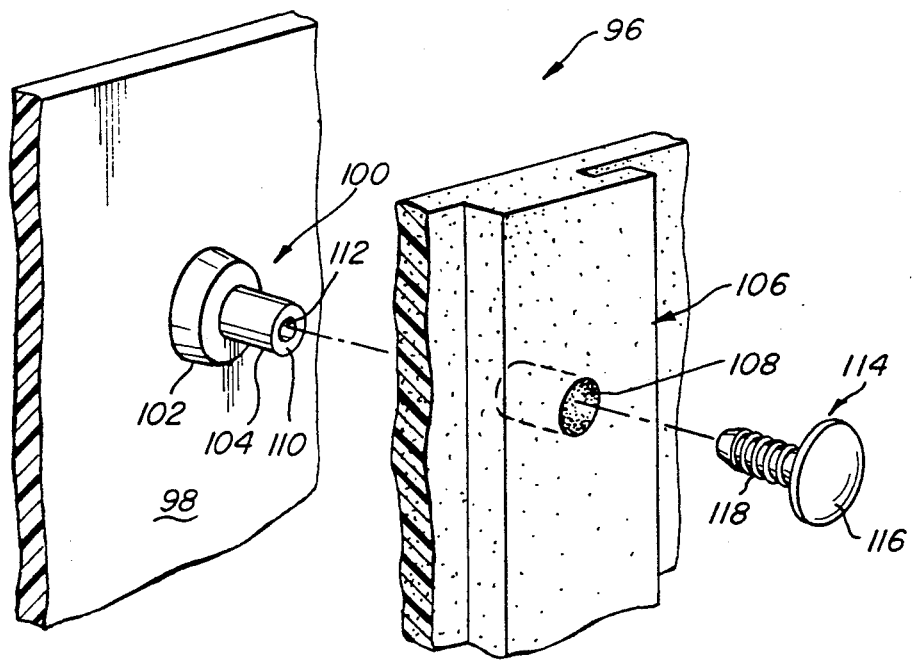
FIG. 13 is an exploded perspective view of an attachment structure according to an alternative embodiment of this invention.
Figure 14:
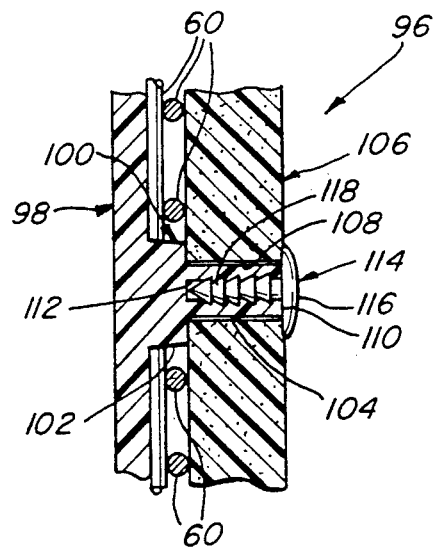
FIG. 14 is a cross-sectional side view of the attachment structure according to the embodiment of FIG. 13.

A final attachment structure for a bumper according to this invention is depicted in FIGS. 13–14. The structure 96 includes an inner panel 98 having a small circular raised surface 100 that can be integrally molded with the inner panel 98. The raised surface has a first tier 102 that has a height off the panel 98 sufficient to clear the basket rails 60 (FIG. 14). The surface also has a second more outwardly disposed tier having a smaller outer diameter than the first tier 102. The second tier 104 projects outwardly from the first tier 102 a distance that is substantially equal to the depth of the foam bumper 106. The bumper hole 108 is sized in diameter to approximately equal the outer diameter of the second tier 104. Hence, as shown in FIG. 14, the assembled bumper 106 and inner panel 98 become firmly engaged upon assembly with the outer tier 104 mated with the bumper hole 108. The outer edge 110 of the second outer tier 104 is substantially flush with the outer face of the bumper 106. The outer edge 110 can also be slightly recessed relative to the outer face of the bumper 106 t insure that the bumper is positively secured to the raised surface 100. Such recess should generally not be so great as to cause unsightly sagging of the foam. The outer tier 104 includes a centrally positioned hole 112 for accepting a fastener 114. The fastener, like those shown from the previous embodiments, has an enlarged head 116 and serrated stem 118 that positively engages the hole 112 upon insertion thereinto.

One advantage of the structure according to FIGS. 13 and 14, as noted above, is that the raised surface has a substantially smaller diameter than the spacing between cart rails 60. Hence, it can be used in more versatile applications on a variety of different cart configurations. Additionally, the flush mating of the face of the bumper 106 and the outer edge 110 of the outer tier 104 eliminates any tendency for the foam bumper 106 to sag around the fastener 114. However, even without sagging, the assembled bumper 106 and inner panel 98 are firmly and substantially permanently attached to each other. It should be noted, that while the above embodiments show inner panels that run the full length or full width, or both, of the cart interior, an inner panel according to this invention can comprise a small plate that overlaps as little as two adjacent rails and that includes a single raised surface. A raised surface having an outer tier according to this embodiment is well suited to such an attachment configuration.

It will be understood by those skilled in the art that various changes and modifications to the embodiment shown in the drawings and described above can be made within the scope of the invention. Accordingly, the foregoing is meant to be only a detailed description of some possible preferred embodiments and should be taken only by way of example. The preferred embodiments and all other equivalents are intended to be encompassed by the following claims.

What is claimed is:

1. A bumper for a shopping cart basket, the basket having a front end opposite a handle-carrying end and sides adjacent the front end, each of the front end and the sides being defined by a plurality of peripheral edges, and the front end and sides each having openings therealong, the bumper comprising:

a sheet of resilient material having a width, a length and a thickness, each of the width and the length being greater than the thickness, the sheet being constructed and arranged to overlay substantially the entire front end of the cart basket along an outer facing surface of the basket, the length and width of the sheet being sized so that the sheet extends along the length and the width to locations substantially adjacent each of the peripheral edges of the front end and the sheet further extends to overlie at least a portion of the adjacent sides of the basket; and a fastening structure positioned along an inner facing surface of the basket and joined to the sheet through the openings in the basket to maintain the sheet against the outer facing surface.

2. A bumper as set forth in claim 1 wherein the fastening structure includes raised portions that project through the openings to flushly engage a face of the sheet.

3. A bumper as set forth in claim 2 wherein the fastening structure comprises a plate positioned against the inner facing surface of the basket and substantially overlapping the sheet.

4. A bumper as set forth in 2 wherein the fastening structure includes a plurality of fasteners positioned through the openings in the basket and joining the fastening structure to the sheet at at least some of the raised portions.

5. A bumper as set forth in claim 4 wherein the basket front end includes peripheral edges that define corners between the front end and the adjacent sides and the sheet extends around the corners and along the adjacent sides to overlie at least a portion of the adjacent sides.

6. A bumper for a shopping cart basket having a front end opposite a handle-carrying end and sides adjacent the front end, the bumper comprising:

a sheet of resilient material constructed and arranged to overlap substantially the entire front end of the basket along an outer facing surface of the basket front end; and a fastening structure positioned along an inner facing surface of the basket and joined to the sheet through the openings in the basket so as to maintain the sheet against the outer facing surface, wherein the sheet further comprises a pair of vertical rails comprising a resilient material positioned on an outwardly facing face of the sheet.

7. A bumper as set forth in claim 6 wherein the rails include slots constructed and arranged to receive a placard.

8. A bumper as set forth in claim 7 wherein the fasteners are positioned upon the vertical rials.

9. A bumper as set forth in claim 8 further comprising a plurality of fasteners positioned proximate vertical edges of the sheet.

10. A bumper for a shopping cart basket having a front end opposite a handle-carrying end and sides adjacent the front end, the bumper comprising:

a sheet of resilient material constructed and arranged to overlap substantially the entire front end of the basket along an outer facing surface of the basket front end; and a fastening structure positioned along an inner facing surface of the basket and joined to the sheet through the openings in the basket so as to maintain the sheet against the outer facing surface, wherein the fastening structure includes a pair of vertical rials, the rails including slots constructed and arranged for mounting a placard along the inner facing surface that is directed inwardly into the basket.

11. A bumper for a shopping cart basket having a front end opposite a handle-carrying end and sides adjacent the front end, the bumper comprising:

a sheet of resilient material constructed and arranged to overlap substantially the entire front end of the basket along an outer facing surface of the basket front end; and a fastening structure positioned along an inner facing surface of the basket and joined to the sheet through the openings in the basket so as to maintain the sheet against the outer facing surface, wherein the basket comprises a plurality of crossing rails and wherein the sheet includes a plurality of grooves constructed and arranged to accommodate the rails.

12. A bumper as set forth in claim 1 wherein the sheet is constructed and arranged to extend onto the adjacent sides of the basket from the front end, the sheet extending around corners positioned between the side and the adjacent sides, the sheet further including vertical edges proximate the adjacent sides, the edges having cut fingers that extend through openings in the adjacent sides and wrap around the inner facing surface of the basket, the fingers being joined to the sheet by fasteners passing through openings located on the adjacent sides.

13. A bumper for a shopping cart basket having a front end opposite a handle-carrying end and sides adjacent the front end, the bumper comprising:

a sheet of resilient material constructed and arranged to overlap substantially the entire front end of the basket along an outer facing surface of the basket front end; and a fastening structure positioned along an inner facing surface of the basket and joined to the sheet through the openings in the basket so as to maintain the sheet against the outer facing surface, wherein the fastening structure includes a plate for engaging the inner facing surface of the basket and having a raised portion projecting through one of the openings in the basket to flushly engage a face of the sheet, the raised surface having a second projection passing through an opening in the sheet for aligning the sheet relative to the raised surface.

14. A bumper as set forth in claim 13 wherein the projection includes an outer edge flush with an outer face of the sheet.

15. A bumper as set forth in claim 14 further comprising a fastener having an enlarged head for engaging the outer edge and the outer face of the sheet and a stem having serrations thereon for engaging a hole in the projection, the serrations along the stem to pass into the opening, but resisting removal of the stem from the opening.

16. A bumper for a shopping cart basket having an upper edge defining a basket opening and a lower edge defining a bottom of the basket and further having a front end and adjacent sides, the front end and sides being separated by a corner transverse to the upper and the lower edges, the basket further having a crossed rail structure with openings therebetween, the bumper comprising:

a sheet of resilient material having a length, a width and a thickness positioned over the front end, the sheet having a thickness that is substantially less than the length and the width, the sheet extending along the length and the width substantially to each of the upper and lower edges of the front end, the sheet further extending around the corners and onto the adjacent sides of the shopping cart;

a plate positioned opposite the sheet along a side of the basket opposite the side adjacent the sheet, the plate including a raised portion passing through one of the openings and flushly engaging the sheet; and a fastener that secures the sheet to the plate at the raised portion.

17. A bumper as set forth in claim 16 wherein the sheet further comprises a plurality of vertical rials projecting outwardly from the sheet on a portion of the sheet adjacent the front end.

18. A bumper as set forth in claim 17 wherein the vertical rails include grooves constructed and arranged to receive a placard therein.

19. A method for providing a bumper to a shopping cart, the cart having a basket with a front and opposite a handle-carrying end and sides adjacent the front end, comprising:

providing a sheet of resilient material constructed and arranged to overlap substantially the entire front end of the basket along an outerfacing surface of the basket front end;

locating the sheet of resilient material over the front end and around corners that interconnect the adjacent sides to the front end;

aligning the sheet so that upper and lower edges of the sheet adjacent the front end are aligned with respective upper and lower edges of the front end; and securing the sheet of the shopping cart basket so that the upper and lower edges of the sheet are aligned with the upper and lower edges of the basket and the sheet extends around the corners.

20. A method as set forth in claim 19 wherein the step of securing includes attaching a plurality of fasteners through openings in the basket, the fasteners engaging each of the sheet and an inner surface of the basket to maintain the sheet against the outerfacing surface of the basket.

21. A method as set forth in claim 19 wherein the step of aligning further includes cutting the sheet so that each of the upper and lower edges of the sheets so that they are sized to be located substantially adjacent the upper and lower edges of the front end.

* * * * *